April 13, 1954  W. M. BROWN, SR  2,675,032
ONE-MAN SAWBUCK FOR USE WITH PUSHCART-TYPE SAWS
Filed Feb. 15, 1949
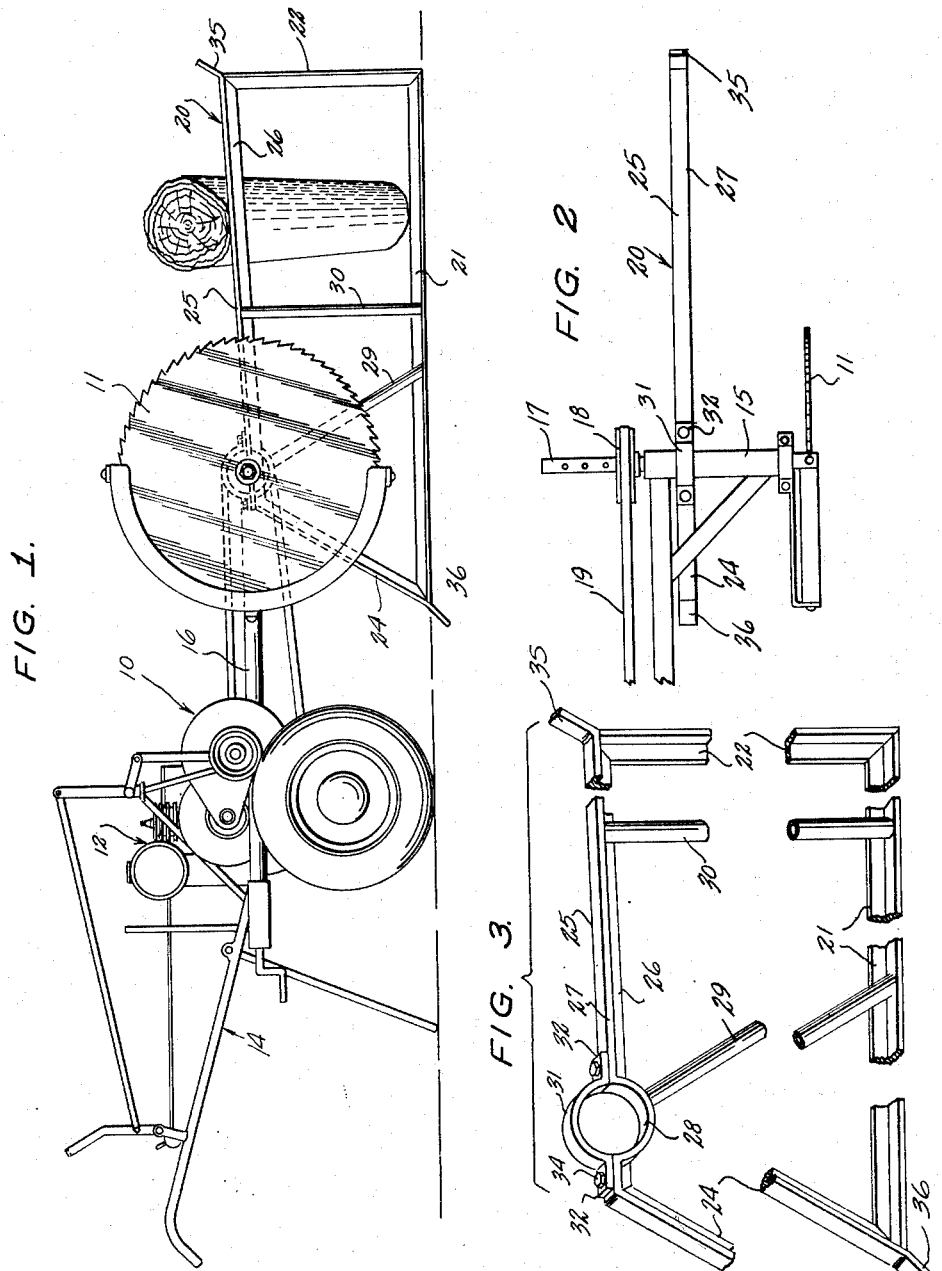
INVENTOR.
WILLIAM M. BROWN, SR.
BY
McMorrow, Berman + Davidson
ATTORNEYS.

Patented Apr. 13, 1954

2,675,032

UNITED STATES PATENT OFFICE 2,675,032

ONE-MAN SAWBUCK FOR USE WITH PUSHCART-TYPE SAWS

William M. Brown, Sr., Forsyth, Mo.

Application February 15, 1949, Serial No. 76,603

2 Claims. (Cl. 143—43)

This invention relates to sawbucks or saw tables, and more particularly to a sawbuck for attachment to a portable, power saw.

It is an object of this invention to provide a sawbuck for attachment to a portable or movable, powered, rotating saw which may be readily attached to and detached from the support for the saw in such a manner that the elongated logs or planks may be cut to desired length at the place where they are found. The sawbuck is so formed and related to the saw that one man can position the log or pole on the sawbuck in a position to be cut. Heretofore long poles or other elongated objects to be cut have been transported by suitable conveying means to a sawmill or saw table where the pole was cut into desired lengths. The transportation of the pole and the handling of the pole on the saw table, which is very short relative to the length of many poles, required the work of several men. It is an object of this invention to provide a sawbuck for use in cutting long poles whereby one man may handily raise one end of the pole onto the sawbuck to a position where the pole will be cut to selected lengths and the cut lengths may be then handled by one man for transportation.

Still another object of this invention is to provide a light-weight sawbuck for attachment to a portable, power saw, which may be handled easily by one man in moving, with the portable saw, to selected places where the poles to be cut may be found.

With the above and other objects in view, my invention consists in the arrangement, combination and details of construction disclosed in the drawings and specification, and then more particularly pointed out in the appended claims.

In the drawings:

Figure 1 is a side elevation of the one-man sawbuck constructed according to an embodiment of my invention, supported on a wheeled, power saw;

Figure 2 is a top plan view of the sawbuck, with the powered saw broken away;

Figure 3 is a perspective view, partly broken away and partly in section, of the sawbuck removed from the circular saw and power means therefor.

Referring to the drawings, the numeral 10 designates generally a portable, powered saw of conventional construction, having a circular saw member or blade 11 powered by a motor 12. The circular saw 11 and motor 12 are supported on a wheeled frame 14 for movement to a selected or desired position. The saw 11 is rotatably supported in an elongated bearing 15, fixed on the outer ends of a supporting rod 16 fixed on the frame 14.

The saw 11 is fixed on a shaft 17 which is rotatably engaged in a bearing 15 having a pulley 18 fixed thereon on the opposite side of the bearing 15 from the saw 11. The shaft 17, together with the circular saw 11 is rotated by a flexible member 19 engaging about the pulley 18 and a driving pulley, not shown in the drawings, rotated by the motor 12.

The sawbuck 20, constructed according to an embodiment of my invention, is formed of lengths of angle bars fixed together to form a frame for disposition adjacent the saw 11 in a plane parallel to the plane of the saw for supporting one end of an elongated pole or log to be cut by the saw.

The sawbuck 20 is formed with an elongated lower bar member 21 which is adapted to lie flatly on the surface of the ground. A vertically-extending end member 22 is fixed on one end of the lower member 21 extending upwardly therefrom. An upwardly and forwardly-inclined end member 24 is fixed on the other end of the lower, horizontal bar 21, and an upper bar 25 is fixed on the upper end of the upwardly-extending supporting bars 22 and 24. The upper and lower bars 21 and 22 are formed of right-angled bars having horizontal flat lower and upper flanges and inwardly-extending flanges. The end members 22 and 24 are also formed of right-angled bars having flat outer flanges and inwardly-extending flanges disposed substantially in alignment with the inwardly-extending flanges of the upper and lower members 25 and 21, respectively.

The upper member 25 is inclined downwardly and inwardly toward one end, the inner end, when the sawbuck 20 is secured on the bearing 15, so that the log or other material to be cut may more readily be moved along the length of the upper member 25 toward the cutting edge of the saw 11.

At the lower end of the upper member 25, the downwardly and inwardly-extending flange 26 is cut away and the upper horizontal flange 27 thereof is depressed or bent downwardly to form a concave, semi-cylindrical bearing seat 28. The bearing seat 28 is disposed adjacent the upper end of the end supporting member 24, whereby the supporting member 24 may be considered as substantially engaged with the seat 28 as a vertical support therefor. An intermediate tubular supporting member 29 extends downwardly and outwardly from the lower surface of the seat 28 for engagement with the lower supporting bar 21 intermediate the length thereof. The supporting members 24 and 29 provide direct supports for the seat 28 in which the bearing 15 for the circular saw 11 is adapted to be engaged.

A second intermediate supporting member 30 is fixed between the upper and lower bars 25 and 21 intermediate the length thereof outwardly from the supporting member 29 and is particularly arranged for supporting the work to be engaged on the upper surface of the work-supporting member 25.

The intermediate supporting member 30 is tubular in formation, similar to the supporting member 29.

A bracket 31, semi-circular in configuration, is adapted to be secured on the upper member 25, over the seat 28 for securing the bearing 15 on the member 25. The member 31 is semi-cylindrical, having the same diameter as the semi-cylindrical sleeve 28, and is adapted to be mounted on the bar 25 confronting the sleeve 28 to provide a clamp for securing the bearing 15 onto the sawbuck 20. The semi-cylindrical member 31 is formed with a pair of outwardly-extending, oppositely-directed arms 32 which flatly overlie the horizontal flange 27 of the member 25, and bolts 34, or other suitable fastening devices, are engaged through the arms 34 for securing the clamping member 31 over the sleeve 28.

A guide member or stop lug 35 is formed on the upper end of the longitudinally-extending upper member 25 for limiting the outward movement of the log or work outwardly on the sawbuck 20. The stop 35 is formed as a continuation of the horizontal flange 27 of the angled upper member 25.

A downwardly and inwardly-inclined anchor member 36 is fixed to or formed integrally with the inner vertical member 24 or the lower horizontal member 21, extending downwardly and inwardly from the corner formed by the intersection of the members 21 and 24. The anchor member 36 may be formed as a continuation of the horizontal flange of either of the members 21 or 24, and the anchor member 36 extends downwardly and inwardly in the direction of the power member 10.

In the use and operation of the sawbuck 20, the portable saw member 10 is moved to a desirable location. The clamping member 31 is removed from the upper member 25 so that the bearing 15 of the saw may be engaged in the seat 28. The member 31 is then secured to the flange 27 of the upper member 25 for clamping the sawbuck 20 onto the bearing 15. A log or other object to be cut may then be positioned so that one end is resting on the horizontal member 25 near the outer upper end thereof. While one man could not lift an entire log up onto a saw table to be cut by the circular saw, one man could lift one end of a log to rest on the upper side of the upper member 25 of the sawbuck 20. The log is then moved downwardly and inwardly on the sawbuck 20 for engagement with the rotating circular saw 11, where the log may be cut into any desirable lengths. The other end of the log may be rested on the ground, or if desired, the one man may lift the end remote from the sawbuck so that the saw 11 will cut the log in a plane substantially perpendicular to the longitudinal axis thereof.

I do not mean to confine myself to the exact details of construction herein disclosed, but claim all variations falling with the purview of the appended claims.

I claim:

1. In combination with a portable power plant, a wheel mounted frame supporting said power plant, an arm secured at one end to said frame and extending outwardly therefrom, a bearing sleeve carried by said arm at the end thereof remote from said frame and disposed substantially perpendicular to said arm, a shaft journalled in said bearing sleeve, a circular saw mounted on said shaft at one end of said bearing sleeve, and means drivingly connecting said power plant to said shaft, a detachable saw buck comprising an elongated upper bar having adjacent one end thereof a concave seat receiving said sleeve, a bracket detachably secured to said upper bar and extending over said sleeve to secure the latter in said seat, said upper bar extending substantially perpendicularly from said sleeve in a direction away from said arm, an elongated lower bar disposed in underlying relationship to said upper bar, and vertically disposed bars extending between said upper and lower bars at spaced apart locations therealong supporting the former on the latter.

2. In combination with a portable power plant, a wheel mounted frame supporting said power plant, an arm secured at one end to said frame and extending outwardly therefrom, a bearing sleeve carried by said arm at the end thereof remote from said frame and disposed substantially perpendicular to said arm, a shaft journalled in said bearing sleeve, a circular saw mounted on said shaft at one end of said bearing sleeve, and means drivingly connecting said power plant to said shaft, a detachable saw buck comprising an elongated upper bar having adjacent one end thereof a concave seat receiving said sleeve, a bracket detachably secured to said upper bar and extending over said sleeve to secure the latter in said seat, said upper bar extending substantially perpendicularly from said sleeve in a direction away from said arm, an elongated lower bar disposed in underlying relationship to said upper bar, vertically disposed bars extending between said upper and lower bars at spaced apart locations therealong supporting the former on the latter, said upper bar being inclined away from said lower bar in a direction away from said sleeve, and a ground engaging anchor formation on the end of said lower bar adjacent said sleeve.

References Cited in the file of this patent

UNITED STATES PATENTS

| Number | Name | Date |
|---|---|---|
| 1,126,312 | Strauss | Jan. 26, 1915 |
| 1,868,770 | See | July 26, 1932 |

FOREIGN PATENTS

| Number | Country | Date |
|---|---|---|
| 69,889 | Great Britain | Sept. 25, 1905 |